United States Patent [19]

Hilfman

[11] 4,009,120

[45] Feb. 22, 1977

[54] PROCESS FOR THE REGENERATION OF A SOLID BED METAL PHTHALOCYANINE CATALYST SYSTEM

[75] Inventor: Lee Hilfman, Mount Prospect, Ill.

[73] Assignee: UOP Inc., Des Plaines, Ill.

[22] Filed: Aug. 18, 1975

[21] Appl. No.: 605,798

[52] U.S. Cl. .............................. 252/413; 208/206; 252/420

[51] Int. Cl.² .................. B01J 31/40; C10G 19/00

[58] Field of Search .............. 252/413, 420, 411.5; 208/206, 207

[56] References Cited

UNITED STATES PATENTS

| | | | |
|---|---|---|---|
| 3,148,156 | 9/1964 | Henry | 252/420 |
| 3,326,816 | 6/1967 | Urban | 252/413 |

Primary Examiner—Winston A. Douglas
Assistant Examiner—P. E. Konopka
Attorney, Agent, or Firm—James R. Hoatson, Jr.; Raymond H. Nelson; William H. Page, II

[57] ABSTRACT

A process is disclosed for the regeneration of a solid metal phthalocyanine catalyst bed system which comprises a metal phthalocyanine impregnated on a charcoal support, said regeneration comprising (a) washing said charcoal support with water at a temperature of about 200° F. to about 350° F. to extract excess caustic and hydrocarbonaceous materials, (b) treating the washed charcoal support with steam at a temperature of about 650° F. to about 1000° F. and (c) reimpregnating the treated charcoal support with from about 0.001 wt. % to about 10:00 wt. % of a metal phthalocyanine compound.

12 Claims, No Drawings

PROCESS FOR THE REGENERATION OF A SOLID BED METAL PHTHALOCYANINE CATALYST SYSTEM

This invention relates to a process for the regeneration of a solid bed metal phthalocyanine impregnated charcoal catalyst system. More specifically, this invention resides in a process for the regeneration of a solid bed metal phthalocyanine impregnated charcoal catalyst system which comprises washing said charcoal with water at a temperature of about 200° to about 350° F. to extract caustic and hydrocarbonaceous materials, treating the washed charcoal support with steam at a temperature of about 650° to about 1,000° F. and reimpregnating the treated charcoal support with from about 0.001 wt. to about 10.00 wt. % of a metal phthalocyanine compound.

Various methods of solid bed treating of petroleum distillates are well known in the art. One such method comprises the conversion of odorous mercaptan compounds contained in a petroleum distillate to their corresponding or respective disulfide compounds by means of passage of the petroleum distillate over a solid bed impregnated metal phthalocyanine catalyst system in the presence of caustic and an oxygen-containing atmosphere. This method which is known as solid bed treating of mercaptan compounds possesses various disadvantages which are amplified by the continuous treatment of various hard or difficult to treat petroleum distillates. For example, in the treatment of highly odorous heavy petroleum distillates such as kerosine, various other toxin-precursor materials are present in the kerosine which become oxidized simultaneously with the mercaptan compounds during passage over the fixed charcoal metal phthalocyanine impregnated catalyst system. These toxin oxidation products form a deposit of heavy oil substances upon the charcoal support catalyst which has the effect of diminishing the contact of the mercaptan compound with the metal phthalocyanine catalytic agent in the solid support system. This problem is amplified in the fact that the toxin materials are accumulated on the catalyst over the passage of time which creates a problem for the refiner. The result of the accumulated toxin compounds upon the solid catalytic system is the necessity for the refiner or treater to regenerate the catalyst system. This invention resides in a process for the regeneration of the catalyst system which will allow the refiner or treater to regenerate the catalyst system at a minimum expense, energy consumption and "downtime" of the solid support catalyst system. This invention may be utilized in the treating arts of petroleum distillates to revitalize spent catalytic solid support systems to enable the refiner to conduct the treating of the mercaptan compounds in a continuous manner of operation where the installation of various metal phthalocyanine impregnated charcoal supports are available to the petroleum distillate in a series or parallel method of treatment where one or more catalyst impregnated charcoal supports may be activated during the regeneration of the second or other spent metal phthalocyanine impregnated charcoal supports.

This invention resides in a process for the regeneration of the metal phthalocyanine impregnated charcoal support which comprises washing said charcoal support with water at a temperature of about 200° to about 350° F. to extract caustic and hydrocarbonaceous material at washing conditions, treating the washed charcoal support with steam at a temperature of about 650° to about 1,000° F. at treatment conditions and reimpregnating the treated charcoal support at impregnation conditions with from about 0.001 wt. to about 10.00 wt. % of a metal phthalocyanine compound. The process of this invention is directed to the regeneration of a metal phthalocyanine impregnated charcoal support system for utilization in the further treatment of mercaptan compounds to their respective oxidation products, namely, disulfide compounds, however, the regenerated catalyst system of the present invention may also be used in such chemical processes as hydroformylation, hydrogenation, dehydrogenation, dehydrocyclization, reforming, transalkylation, isomerization, isomax, etc. A further utilization of the regenerated catalyst system would be in the treatment of aqueous or aqueous-alkali streams containing hydrogen sulfide for conversion to elemental sulfur in view of ecological treatment benefits for the disposal of potentially harmful pollutants.

It is an object of this invention to provide a process for the regeneration of a catalyst system which has become spent as a result of accumulated toxin material deposition.

A further object of this invention is to provide a process for the regeneration of a spent metal phthalocyanine impregnated charcoal support system utilizing the steps of washing, treating and reimpregnation of the washed and treated charcoal support.

In one aspect an embodiment of this invention resides in a process for the regeneration of a catalyst system which comprises a metal phthalocyanine impregnated charcoal support which comprises washing said charcoal support with water at a temperature of about 200° to about 350° F. to extract caustic and hydrocarbonaceous materials at washing conditions, treating the washed charcoal support with steam at a temperature of about 650° to about 1,000° F. at treatment conditions, reimpregnating the treated charcoal support at impregnation conditions with from about 0.001 wt. to about 10.00 wt. % of a metal phthalocyanine compound and recovering the resultant regenerated catalyst system.

A specific embodiment of this invention resides in the regeneration of a cobalt phthalocyanine monosulfonate impregnated Norit charcoal which has become spent by the accumulation of caustic and hydrocarbonaceous materials, said regeneration comprising the washing of the Norit charcoal support with water at a temperature of about 212° F. to remove or extract caustic and hydrocarbonaceous materials, treating the washed Norit charcoal support with steam at a temperature of about 650° to about 1000° F. and reimpregnating the treated charcoal support with cobalt phthalocyanine monosulfonate with 150 milligrams of the cobalt phthalocyanine monosulfonate per 100 cubic centimeters of the Norit charcoal.

Another specific embodiment of the present invention resides in the regeneration of a cobalt phthalocyanine monosulfonated impregnated Hydrodarco charcoal support which comprises the treatment of the Hydrodarco charcoal support with water at a temperature of about 212° F. to a pH of about 9, which indicates the extraction of caustic and hydrocarbonaceous materials, treating the washed charcoal support with steam at a temperature of 850° F. for a period of time comprising 3 hours and reimpregnating the Hydrodarco charcoal support with 150 milligrams of cobalt phthalocyanine monosulfonate per 100 cubic centimeters of Hydrodarco charcoal.

Other objects and embodiments of the above set forth invention will be found in the following further detailed description of the present invention concerning the regeneration of a spent metal phthalocyanine impregnated charcoal support.

As hereinbefore set forth the present invention is concerned with a process for the regeneration of a catalyst system comprising a metal phthalocyanine impregnated charcoal support. The first step in the regeneration process is effected by washing the charcoal support with water at a temperature of about 200° to about 350° F. to extract caustic and hydrocarbonaceous materials at washing conditions. It is, of course, possible that the water may be present in the form of steam when the treating is effected at temperatures between 212° F. and 350° F. for purposes of washing the charcoal support. The washing conditions include a pressure of from about 1 atmosphere to about 100 atmospheres. The pressure may be afforded by a substantially inert gas such as nitrogen or helium and the inert gas may be used to function as not only an inert diluent but also as a carrier agent for the removal of the caustic and hydrocarbonaceous materials. The caustic and hydrocarbonaceous materials are extracted from the charcoal bed by the waterwashing of the support. The pH of the washing system can be used as an indicator of the quantity of caustic and hydrocarbonaceous materials removed from the solid support. In a preferred embodiment of this invention the pH should be lower than 9 to accomplish the removal of excess caustic and hydrocarbonaceous material. It is also within a preferred embodiment of this invention that a dilute carboxylic acid solution may also be used during the washing procedures. When the dilute carboxylic acid is utilized, the support washing system may be lowered to a pH of about 7, however, it should be noted that the carboxylic acid should be removed from the charcoal support system by subsequent water washing. Suitable examples of carboxylic acids would include formic acid, acetic acid, propionic acid, n-butyric acid, isobutyric acid, n-valeric acid, trimethylacetic acid, caproic acid, n-heptylic acid, caprylic acid, pelargonic acid, glacial acetic acid, etc. The washed charcoal is subsequently treated with steam at a temperature of about 650° to about 1,000° F. at treatment conditions. The treatment conditions of the present invention include a pressure of from about 1 atmosphere to about 100 atmospheres which may also be afforded by the presence of a substantially inert gas such as nitrogen, helium or argon. The inert gas may be used not only as a diluent but also as a carrier agent to remove any free floating heavy oils which are stripped from the charcoal support as a result of the treating with the superheated stream at a temperature of 650° to about 1000° F. The steam treating will be effected to an extent of from about 0.010 lbs. of steam per lb. of catalyst per hour to about 0.800 lbs. of steam per lb. of catalyst per hour. The use of a minimum amount of steam is desirable in light of economical energy considerations. The treated charcoal is reimpregnated at reimpregnation conditions with from about 0.001 wt to about 10.00 wt. % of a metal phthalocyanine compound. The reimpregnation conditions of the present invention include any impregnation conditions known to the art and more specifically from about 75° to about 100° F. and a pressure of about 1 atmosphere to about 100 atmospheres.

It should be noted that the present invention may be effected without any reimpregnation of the metal phthalocyanine compound to the solid charcoal support, although not necessarily with equivalent results. The reimpregnation of the charcoal support is performed by any method known to the art, however, the charcoal support which has been treated with the superheated steam will maintain a residual metal phthalocyanine compound. The reimpregnation of the treated charcoal support will augment any metal phthalocyanine compound of the charcoal support which remains after the steam treating.

The charcoal solid support of the present invention may be exemplified by charcoals which are produced from destructive distillation of wood, peat, lignite coal, bituminous nutshells, bone char, vegetable matter or other carbonaceous matters such as Nuchar charcoals, that may be purchased from the Westvaco Company, which is a charcoal derived from vegetable sources such as ground wood pulp, Hydrodarco (also known as DARCO), which may be purchased from the Atlas Chemical Company and is further exemplified in Example II of the present application, Norit charcoal that may be purchased from the Norit Company, which is a charcoal derived from peat and is further exemplified in Example I of the present application, Columbia carbon which is a special charcoal extradited from petroleum black and may be purchased from the Union Carbide Company, Pittsburgh charcoal which is derived from lignite coal and may be purchased from the Calgon Company, etc. The metal phthalocyanine compound of the present invention which is utilized to reimpregnate the treated charcoal support may be exemplified by sulfonated or carboxylated metal phthalocyanine compounds such as iron phthalocyanine, cobalt phthalocyanine, copper phthalocyanine, vanadium phthalocyanine, manganese phthalocyanine, magnesium phthalocyanine, zinc phthalocyanine, titanium phthalocyanine, hafnium phthalocyanine, thorium phthalocyanine, tin phthalocyanine, lead phthalocyanine, bismuth phthalocyanine, tantalum phthalocyanine, antimony phthalocyanine, chromium phthalocyanine, molybdenum phthalocyanine, nickel phthalocyanine, palladium phthalocyanine, platinum phthalocyanine, silver phthalocyanine, mercury phthalocyanine, rhodium phthalocyanine, iridium phthalocyanine, ruthenium phthalocyanine, osmium phthalocyanine, technitium phthalocyanine, or vanadium phthalocyanine tetrasulfonate, cobalt phthalocyanine monosulfonate, cobalt phthalocyanine disulfonate, manganese phthalocyanine monosulfonate, manganese phthalocyanine carboxylate, zinc phthalocyanine monosulfonate, titanium phthalocyanine disulfonate, hafnium phthalocyanine carboxylate, thorium phthalocyanine dicarboxylate, tin phthalocyanine carboxylate, lead phthalocyanine monosulfonate, tantalum phthalocyanine monosulfonate, bismuth phthalocyanine tetrasulfonate, chromium phthalocyanine carboxylate, molybdenum phthalocyanine carboxylate, molybdenum phthalocyanine tetracarboxylate, nickel phthalocyanine monosulfonate, palladium phthalocyanine disulfonate, palladium phthalocyanine monosulfonate, silver phthalocyanine monosulfonate, mercury phthalocyanine tetrasulfonate, iridium phthalocyanine carboxylate, ruthenium phthalocyanine carboxylate, iridium phthalocyanine tetrasulfonate, osmium phthalocyanine trisulfonate, etc.

It is understood that the aforementioned carboxylic acids, charcoal supports and metal phthalocyanine compounds are only representative of the class of compound which may be employed in the present invention and that the present application is not limited thereto.

The regenerated or rejuvinated metal phthalocyanine impregnated charcoal support may be utilized in the conversion of mercaptan-containing compounds present in a petroleum distillate. The mercaptan-containing compounds may be exemplified by mercaptan compounds possessing from about 1 carbon atom to mercaptan compounds possessing about 19 carbon atoms. Other mercaptan compounds which may also be present will include the aromatic mercaptans such as thiophenol or substituted thiophenol or branched-chained aliphatic hard-to-treat mercaptans such as tertiary dodecyl mercaptans. Specific types of mercaptans which may be converted to disulfide materials utilizing the regenerated or rejuvinated solid bed catalyst system of the present invention will include methyl mercaptan, ethyl mercaptan, propyl mercaptans, butyl mercaptans, pentyl mercaptans, hexyl mercaptans, heptyl mercaptans, octyl mercaptans, nonyl mercaptans, decyl mercaptans, undecyl mercaptans, dodecyl mercaptans, tridecyl mercaptans, tetradecyl mercaptans, pentadecyl mercaptans, hexadecyl mercaptans, heptadecyl mercaptans, octadecyl mercaptans, nonadecyl mercaptans, various mercaptobenzothiophenols, hydroxymercaptans such as mercaptoethanol, cysteine, thiophenol, ethyl-substituted thiophenol isomers, methyl-substituted thiophenol isomers. The treatment of the mercaptan-containing compound in the presence of the rejuvinated metal phthalocyanine impregnated charcoal support will be effected in a medium which is caustic in nature such as sodium hydroxide, potassium hydroxide, lithium hydroxide, rubidium hydroxide, cesium hydroxide, or any other suitable caustic material including suitable quaternary ammonium compounds.

The following examples are introduced to illustrate the further novelty and utility of the present invention but not with the intention of unduly limiting the same.

EXAMPLE I

In this example a Norit PKDA charcoal set forth in Table I below was impregnated with 150 milligrams of cobalt phthalocyanine monosulfonate and continuously utilized to convert mercaptan compounds to disulfide until the accumulation of heavy oil was observed on the surface of the charcoal support.

TABLE I

| Apparent bulk density, g/cc | 0.267 |
|---|---|
| Ca (by AAS), wt-% | 0.56 |
| Mg (by AAS), wt-% | 0.52 |
| Emission spectrograph analysis, wt-% metal | |
| Fe | 0.055 |
| Ni | 0.0022 |
| V | <0.002 |
| Mn | 0.010 |
| Cr | 0.0053 |
| Sn | — |
| Cu | 0.0023 |
| Zn | — |
| Ti | 0.010 |
| Pb | — |
| Na | 0.100 |
| Mo | — |
| Co | — |
| Si | 1.3 |
| Al | Diluent |
| Ba | — |
| Sr | — |

The used impregnated charcoal catalyst was wetted with 5 milliliters 10° Be sodium hydroxide and added to a beaker containing 100 milliliters of a sour kerosine distillate possessing the physical properties of Table II below:

TABLE II

| HYDROGEN SULFIDE | 2 ppm |
|---|---|
| MERCAPTAN SULFUR | 390 ppm |
| COPPER 0.021 mg/liter | |
| ¹ACID NUMBER | 0.001 ml/KOH/gram |
| ²SAYBOLT COLOR | 30 |
| API GR 60° F. | 42.9 |
| SP GR 60° F. | 0.8114 |
| DISTILLATION | |
| IBP ° F. | 349 |
| 5 | 364 |
| 10 | 368 |
| 30 | 384 |
| 50 | 404 |
| 70 | 425 |
| 90 | 456 |
| 95 | 470 |
| EP ° F. | 490 |

¹ACID NUMBER is determined by titration with potassium hydroxide.
²SAYBOLT COLOR is measured after 20 hour acceleration.

The kerosine was shaken with the used metal phthalocyanine impregnated charcoal support in the presence of air at ambient conditions of pressure and temperature. The kerosine samples were removed periodically, filtered and analyzed for mercaptan sulfur content, said analysis being set forth in Table III below:

TABLE III

| Shaking Time, Minutes | Wt-ppm Mercaptan Sulfur |
|---|---|
| 0 | 388 |
| 30 | 81 |
| 60 | 45 |
| 90 | 33 |
| 120 | — |

The results of Table III above indicate that the treated kerosine charge stock possesses 81 ppm mercaptan sulfur at 30 minutes and 33 ppm sulfur at 90 minutes. The charcoal Norit bed was recovered from the beaker and treated with water at 212° F. at a pressure of 1 atmosphere for a period of time necessary to lower the pH of the Norit charcoal support bed to less than 9. The bed was treated with a hot dilute acetic acid wash to obtain a pH of less than 7 and subsequently with a boiling water wash to remove excess acetic acid. The Norit charcoal was then treated with steam at 850° F. for 3 hours at a rate of 4 moles of steam per hour and dried at ambient conditions. The steam-treated bed was added to a second beaker containing 5 milliliters of 10° Be sodium hydroxide plus 100 milliliters of the kerosine distillate set forth in Table II above. The kerosine was shaken with the non-reimpregnated charcoal support in the presence of air at ambient conditions of pressure and temperature. Kerosine samples were removed periodically, filtered and analyzed for mercaptan sulfur content, said analysis being set forth in Table IV below:

TABLE IV

| Shaking Time, Minutes | Wt-ppm Mercaptan Sulfur |
|---|---|
| 0 | 388 |

TABLE IV-continued

| Shaking Time, Minutes | Wt-ppm Mercaptan Sulfur |
|---|---|
| 30 | 29 |
| 60 | 20 |
| 90 | 11 |
| 120 | 7 |

A second portion of the steam-treated charcoal bed was further reimpregnated using known impregnation techniques with fresh cobalt phthalocyanine monosulfonate catalyst to the extent that the catalyst support possessed 150 milligrams of cobalt phthalocyanine monosulfonate per 100 cubic centimeters of Norit charcoal. The reimpregnated catalyst support was again wetted with the sodium hydroxide and added to 100 milliliters of the sour kerosine distillate set forth in Table II above. The kerosine was again continually shaken with the reimpregnated charcoal catalyst in the presence of air at ambient conditions of pressure and temperature. Kerosine samples were removed periodically, filtered and analyzed for mercaptan sulfur content, said analysis being set forth in Table V below:

TABLE V

| Shaking Time, Minutes | Wt-ppm Mercaptan Sulfur |
|---|---|
| 0 | 388 |
| 30 | 12 |
| 60 | 6 |
| 90 | 4 |
| 120 | 2 |

An analysis of the results obtained in Tables III, IV and V of this example demonstrate the unexpected novelty of the present invention. In Table III the mercaptan-containing charge stock was treated with a known spent or greatly diminished Norit impregnated metal phthalocyanine catalyst. The wt-ppm mercaptan at 30 minutes was 81 ppm and 33 ppm at 90 minutes. In contrast to Table III, Table IV indicates that a steam treated non-reimpregnated metal phthalocyanine impregnated charcoal support gave a value of 29 wt-ppm mercaptan sulfur at 30 minutes and 11 ppm mercaptan sulfur after 90 minutes. The results in Table V were obtained utilizing the process for the regeneration of the spent Norit charcoal exemplified in Table III above. The wt-ppm mercaptan sulfur of Table V at 30 minutes was 12 ppm and at 90 minutes only 4 ppm. This table exemplifies a reduction of 81 ppm at 30 minutes (Table III) to 12 ppm at 30 minutes (Table V) after the utilization of the regeneration techniques of the above set forth invention. Also, this invention is exemplified by the results of obtaining only 4 ppm mercaptan sulfur utilizing the regeneration techniques of this invention in contrast to the 33 ppm mercaptan sulfur obtained without the utilization of the regeneration techniques of this invention.

EXAMPLE II

In this example a used Hydrodarco charcoal impregnated with 150 milligrams of cobalt phthalocyanine monosulfonate per 100 cubic centimeters of the Hydrodarco charcoal was wetted with 5 milliliters of 10° Be sodium hydroxide and added to 100 milliliters of a sour kerosine distillate as exemplified in Table II above. The kerosine was shaken with the spent catalyst charcoal support system in the presence of air at ambient conditions of pressure and temperature. Kerosine samples were removed periodically, filtered and analyzed for mercaptan sulfur content, said analysis being set forth in Table VI below:

TABLE VI

| Shaking Time, Minutes | Wt-ppm Mercaptan Sulfur |
|---|---|
| 0 | 390 |
| 30 | 124 |
| 60 | 80 |
| 90 | 64 |
| 120 | 54 |

The Hydrodarco impregnated charcoal bed is recovered and washed with boiling water to a pH of less than 9, with dilute acetic acid to a pH less than 7 and finally with boiling water wash at 212° F. to remove excess acetic acid. The washed charcoal bed is treated with steam at a temperature of 850° F. for a period of time comprising 3 hours at a rate of 4 moles per hour of steam. The washed and treated charcoal catalyst system was tested with 100 milliliters of the kerosine set forth in Table II above in a shake test procedure, said test results being set forth in Table VII below:

TABLE VII

| Shake Time, Minutes | Wt-ppm Mercaptan Sulfur |
|---|---|
| 0 | 390 |
| 30 | 23 |
| 60 | 12 |
| 90 | 6 |
| 120 | 4 |

The results set forth in Table VII show that the non-reimpregnated charcoal support reduced the mercaptan content level from 124 ppm mercaptan sulfur at 30 minutes in comparison to 23 wt-ppm mercaptan sulfur during the same time span of treatment utilizing the washed and steam treated charcoal catalyst system. Also, after 120 minutes of treating utilizing the spent charcoal material the wt-ppm mercaptan sulfur was 54 in contrast to the 4 ppm obtained utilizing the washed, treated and non-reimpregnated charcoal catalyst system. A portion of the washed and steam treated charcoal system was further reimpregnated with fresh cobalt phthalocyanine monosulfonate catalyst to the extent that the charcoal support possessed 150 milligrams of cobalt phthalocyanine monosulfonate per 100 cubic centimeters of Hydrodarco charcoal. The results of testing the reimpregnated, washed and treated catalyst are set forth in Table VIII below:

TABLE VIII

| Shake Time, Minutes | Wt-ppm Mercaptan Sulfur |
|---|---|
| 0 | 390 |
| 30 | 10 |
| 60 | 5 |
| 90 | 3 |
| 120 | 2 |

It should be noted that Table VIII demonstrates that the reimpregnated charcoal catayst system further decreased the mercaptan content (23 ppm of Table VII at 30 minutes versus 10 ppm at 30 minutes of Table VIII) and greatly diminished the mercaptan content in comparison with Table VI which utilized the spent Hydrodarco charcoal system. In Table VI after 30 minutes of treating the wt-ppm mercaptan sulfur was found to be 124 ppm in comparison to the 10 ppm obtained utilizing the washed, steam treated and reimpregnated catalyst of Table VIII. The diminishment of wt-ppm mercaptan sulfur at 30 minutes is a factor of greater than 10 and this factor is maintained throughout the 120 minutes of the treating of the mercaptancontaining petroleum distillate kerosine.

I claim as my invention:

1. In a process for the regeneration of a catalyst system comprising a metal phthalocyanine impregnated charcoal support which is deactivated as a result of the treatment of a petroleum distillate with caustic and oxygen or air in the presence of said support wherein mercaptans are substantially converted to disulfides, said process comprises washing said charcoal support with liquid water and a carboxylic acid at a temperature of about 200° to about 350° F. to extract caustic and hydrocarbonaceous materials at a pressure of from about 1 atmosphere to about 100 atmospheres, the improvement which comprises treating said washed charcoal support with superheated steam at a temperature of about 650° to about 1,000° F. at a pressure of from 1 atmosphere to about 100 atmospheres and reimpregnating the steam-treated charcoal support at reimpregnation conditions with from about 0.001 weight percent to about 10.000 weight percent of a metal phthalocyanine compound.

2. The process of claim 1 further characterized in that the carboxylic acid is acetic acid.

3. The process of claim 1 further characterized in that the carboxylic acid is glacial acetic acid.

4. The process of claim 1 further characterized in that the carboxylic acid is pelargonic acid.

5. The process of claim 1 further characterized in that the reimpregnation conditions include a temperature of about 75° to about 100° F. and a pressure of about 1 atmosphere to about 100 atmospheres.

6. The process of claim 1 further characterized in that the charcoal is derived from lignite coal.

7. The process of claim 1 further characterized in that the charcoal is derived from bituminous coal.

8. The process of claim 1 further characterized in that the charcoal is derived from vegetable sources.

9. The process of claim 1 further characterized in that the metal phthalocyanine compound is cobalt phthalocyanine.

10. The process of claim 1 further characterized in that the metal phthalocyanine compound is vanadium phthalocyanine.

11. The process of claim 1 further characterized in that the treated charcoal support is dried at drying conditions before impregnation of the metal phthalocyanine compound.

12. The process of claim 11 further characterized in that the drying conditions include a temperature of about 850° to about 650° F. and a pressure of about 1 atmosphere to about 100 atmospheres.

* * * * *